Dec. 15, 1953  E. C. HENDERSON  2,662,604
PARKING ATTACHMENT FOR AUTOMOBILES
Filed March 17, 1950  5 Sheets-Sheet 1

INVENTOR,
ELDON C. HENDERSON
BY Oswald H. Milmore
His Attorney

Dec. 15, 1953  E. C. HENDERSON  2,662,604
PARKING ATTACHMENT FOR AUTOMOBILES
Filed March 17, 1950  5 Sheets-Sheet 4

INVENTOR,
ELDON C. HENDERSON
BY Oswald H. Milmore
His Attorney

Dec. 15, 1953          E. C. HENDERSON          2,662,604
PARKING ATTACHMENT FOR AUTOMOBILES
Filed March 17, 1950                       5 Sheets-Sheet 5

INVENTOR.
ELDON C. HENDERSON
BY Oswald H. Milmore
His Attorney

Patented Dec. 15, 1953

2,662,604

UNITED STATES PATENT OFFICE 2,662,604

PARKING ATTACHMENT FOR AUTOMOBILES

Eldon C. Henderson, Paso Robles, Calif.

Application March 17, 1950, Serial No. 150,215

26 Claims. (Cl. 180—1)

This invention relates to attachments for automobiles whereby the car or a part thereof is made to move in a desired direction, such as laterally. This invention finds particular, although not exclusive, application when attached to the rear end of a vehicle in order to facilitate street parking parallel to the curb by driving the car forwardly while approaching the curb obliquely until the front wheels are in parking position, and thereafter operating the parking device to move the rear wheels laterally toward the curb.

More particularly, the invention is concerned with a parking mechanism adapted to be permanently or temporarily attached to a car comprising a plurality of walking arms pivotally mounted at their upper ends about pivot axes perpendicular to the direction toward which it is desired to displace the car, the arms being of such lengths as to engage the ground obliquely, the arms being provided with power drive means for imparting sequential distention and retraction strokes whereby part of the load of the car is taken off the wheels and carried sequentially by the arms and the car is displaced in the said direction.

Although the invention will be described with reference to a preferred embodiment which is attached to the rear end of a motor vehicle for shifting the rear wheels toward the right, it is evident that the device may be attached to the front end of the vehicle, and that one or a pair of such devices, similarly constructed but to opposite hand, can be attached, if desired, for shifting both ends of the vehicle toward the right or left.

The difficulty of maneuvering a vehicle toward the curb between other vehicles which are parked in adjoining parking spaces has heretofore been recognized and there have been prior proposals to facilitate parallel parking by shifting the rear end of the vehicle transversely after entering the parking space by an oblique forward movement of the car. Such prior devices have, however, usually required the use of one or more controls or actuating devices for shifting the walking arms to their raised, inoperative positions and to their depressed, operative positions, in addition to the main operating mechanism for operating the arms to impart the power strokes thereto for moving the vehicle. Other prior devices have utilized one or more wheels or wheel sectors revolving about the center of curvature of the wheel by a motivated torque applied thereto and/or through a complete circle; such devices are subject to the limitations that they are not suitable for operation on uneven pavements which may be at varying distances from the rotation axis and/or cannot be employed on modern cars wherein the floor is near to the ground.

It is the general object of this invention to provide an improved vehicle parking device adapted to be attached to a vehicle for displacing it in a desired direction having a plurality of walking arms which are pivotally mounted at their upper ends to engage the ground obliquely and are provided with driving mechanism for imparting to the arms coordinated, sequential stepping movements at the control of the vehicle operator to partly lift the vehicle and shift it in the desired direction, the arms being freely rotatable about their pivots and urged into their operative positions by resilient means.

A further object is to provide a device of the character described wherein the walking arms are motivated for extending and reducing their overall lengths by a rotating crank which is driven continuously in the same direction and to which the walking arms are pivotally connected for rotation about eccentric crank pin axes, the arms being urged by resilient means to rotate to engage the ground and not subjected to any motivated torque; by such an arrangement the device is readily driven by any continuous source of power, such as an electric motor or a power take-off from the engine and the device is adapted for operation on uneven roadways.

Certain specific objects are to provide a vehicle parking device of the type indicated wherein the walking arms are actuated by a continuously rotating shaft having crank means for moving the pivotally supported, upper ends of the walking arms with sequential circular motions, the arms being provided with resilient means arranged to impose an upward torque thereto for swinging the arms about their pivotal supports upwardly into inoperative positions at one or more angular positions of the shaft and to impose a downward torque to the arms for swinging the arms downwardly into operative, ground-engaging positions at other angular positions of the shaft, whereby the shaft can perform both the function of driving the walking arms for moving the vehicle and the function of regulating the position of the arms; to provide a device wherein the walking arms have curved shoes or feet with the center of curvature disposed eccentrically with respect to the pivot centers at the upper ends of the arms for engaging the ground at different distances from said pivot centers so as to adapt the device for operation on uneven pavement and to permit engagement of the arms with the ground at varying inclinations to the vertical for effecting a progressive and more closely continuous movement of the vehicle; and to provide improved walking arms wherein the shoes at the lower ends are pivotally attached to the extremities of the arms so that the vehicle may be driven forwardly or rearwardly from a parked position in which the shoes are in engagement with the ground without injury to the device.

A further important object is to provide an improved parking device which is fully automatic in operation in the sense that placing the device into operation is effective to perform the successive operations of depressing the walking arms from their stowed, raised, inoperative positions to their lowered, operative positions with the shoes in engagement with the ground and of actuating the arms to make coordinated stepping movements. Ancillary thereto, it is an object to provide a device wherein the same driving mechanism, when stopped in a predetermined position in its cycle of operation, will cause the walking arms to be raised to their inoperative positions clear of the ground after the parking operation, for example, when the car is driven off, without further attention or action on the part of the operator. A further ancillary object is to provide a control system for the parking device for stopping the driving mechanism always in a predetermined position so as to insure the automatic elevation of the walking arms following any operation of the device so that the entire operation, including the lowering of the arms, their operation to displace the vehicle, and their re-elevation, can be brought about by the operator through the single operation of applying power to the driving mechanism, e. g., by closing an electrical circuit, and continuing the application of power for such time as he desires the vehicle to continue the displacing movement.

Still further objects will become apparent from the following description.

In summary, the parking device, when applied to the rear end of an automobile, comprises a support structure which is rigidly connected to the vehicle near the differential housing and has a plurality of ground-engaging walking arms which preferably have shoes at their lower extremities presenting an extended, downwardly convex surface having a high coefficient of friction for engaging the ground at any point along the shoe. The arms extend obliquely upwards from the ground contact points toward the direction in which it is desired to move the vehicle to the support structure and are there pivotally supported about horizontal axes for rotation in one or more planes parallel to the same direction, e. g., transversely to the vehicle. A driving mechanism is provided at the support structure for sequentially imparting reciprocating movements to the arms, each movement including a power stroke or projection which increases the distance from the lower end of the arm to the support structure and a retraction stroke which decreases this distance; the several arms are moved simultaneously but their corresponding strokes are out of phase, such relationship being for brevity herein referred to as sequential movement. In the specific embodiment to be described the drive mechanism comprises a power driven crank shaft extending longitudinally with respect to the vehicle and having a plurality of eccentric pivot axes having different angular orientations which form the above-mentioned horizontal axes about which the arms are rotatable. The term crank is herein used generically to include devices having ordinary crank arms, discs, eccentrics, etc., capable of imparting reciprocating movement to the arms. The shaft may be rotated continuously by an electric motor especially provided for the purpose or by a power take-off from the vehicle engine.

One or more of the arms is provided with resilient pull-down means arranged to apply a downward torque to the arm for rotating it downwardly into operative position with the shoe pressed against the ground during the part of the cycle of the crank shaft in which the arm begins its power stroke against the ground, and to apply an upward torque during another part of the cycle for urging the arm upwardly into stowed, inoperative position. Various spring arrangements are suitable for this purpose; the one to be described in detail comprises a tension spring, herein referred to as the pull-down spring, having one end thereof attached to the arm at an attachment point remote from the crank pin axis and the other end anchored at an anchor point which is so located that the tension line of the spring is inclined to one side of the geometrical line from the said attachment point to the crank pin axis during one part of the cycle and is inclined to the other side of said geometrical line during another part of the cycle. The anchor point may be stationary with respect to the axis of the crank shaft or rotated about the axis; the latter is effected by providing an auxiliary crank on the crank shaft, offset angularly from the crank pin axis of the said walking arm and anchoring the spring to the auxiliary crank.

Each walking arm is provided with resilient means for applying a downward torque at least during the part of its cycle of operation which includes its retracted position, herein also referred to as top dead center. This downward torque should act during at least a part of the slack, retraction stroke of the arm to cause the arm to progress in the direction of desired movement of the vehicle and continue somewhat into the power stroke to insure that the arm takes hold of the pavement when distended or projected. The invention contemplates any of various suitable arrangements for providing such downward torque, e. g., the provision of a separate pull-down spring, arranged as described in the preceding paragraph, for each arm. According to the preferred construction, however, only one arm has a pull down spring of that type and the resilient means comprise a plurality of coordinating springs interconnecting the several walking arms in a series. Thus, each arm is connected by a coordinating spring with another arm which operates out of phase therewith to apply a downward torque to the former arm when the latter is projected and engaged with the ground. When only two walking arms are provided each coordinating spring is connected to both arms.

According to a preferred arrangement, the ends of the coordinating springs are connected to the respective arms so that the tension line of each spring is close to but displaced somewhat to one side of the axis of the crank shaft, so that the arm which is in retracted position, near top dead center, is always given a downward torque; the spring may or may not apply an upward torque to the other arm connected thereto, depending upon the specific geometrical arrangement and dimensions and may even apply a downward torque also to the projected arm if the tension line of the spring is on the side of the crank pin axis of the latter arm toward the desired direction of movement of the vehicle. When the coordinating spring exerts an upward torque on the projected arm the latter is prevented from rotating upwards by the frictional engagement of its loaded shoe with the ground.

Rotation of the crank shaft causes the pull-down spring to move the arm connected thereto (herein designated as the first arm) to engage the ground at the beginning of or prior to the beginning of the projection stroke thereof. Continued rotation of the shaft projects the first arm, causing the shoe thereof to be pushed firmly against the ground, thereby raising the vehicle slightly, pushing it with a sliding movement on its own wheels, and loading the shoe sufficiently to secure the arm frictionally in its lowered position. The first arm is thereby maintained angularly in its operative position although the pull-down spring reverses its action and tends to move the arm up and despite the application of an upward torque by the coordinating springs during any part of the power stroke. Because the arm is free to rotate on the crank pin axis and is not given any motivated torque it is able to adapt its angular position to the ground elevation and to change its angular position slightly while the vehicle is displaced. Moreover, the optional but preferred use of a shoe with an elongated, downwardly convex face having a long radius of curvature about a center which is eccentric to the crank shaft to the side away from the desired direction of vehicle movement permits the arm to engage the ground at different elevations with only a slight deviation from the designed angular position, thereby insuring good frictional engagement despite high spots or depressions in the ground.

While the first arm is thus loaded and held in operative position the coordinating springs apply a downward torque to the second arm in the series, urging the shoe thereof against the ground with sufficient force to prevent slippage. When the second arm is projected it takes a "bite" and becomes loaded, thereby further moving the vehicle and securing itself frictionally in operative position. The action of the coordinating springs again changes during the projection stroke of the second arm and they apply a downward torque to the next arm in the series (which is the first arm when the device has only two arms).

The device is optionally, although preferably, further provided with a pull-up spring connected by an equalizer for urging the several arms up; individual pull-up springs for the several arms may be provided. The pull-up spring or springs are weak enough to be overbalanced by the force of the pull-down spring, and/or may be made adjustable to vary the tension thereof.

Additionally, the shoes are preferably mounted on pivotal supports at the lower ends of the arms with axes substantially parallel to the desired direction of vehicle movement and given resilient means for urging them to normal position; and power control means, such as an electrical sector limit switch connected to the crank shaft, is provided for stopping the crank shaft always in a predetermined angular position at which the pull-down spring acts to apply an upward torque to the arms (or to the first arm, when only one pull-down spring is used) for elevating them to clear the ground when the car is moved from its parked position.

The invention will be further described in detail with reference to the accompanying drawings forming a part of this specification and illustrating two embodiments, wherein.

In the description of the views and in this specification the terms "right," "left," "front" and "rear" are used with reference to directions of the vehicle to which the device is attached. The terms "top dead center" and "bottom dead center" are used herein to denote the angular positions of the crank shaft wherein a specified crank pin axis is farthest or closest, respectively, from the contact point of the shoe with the ground, i. e., with point D in line with points O and F in Fig. 9.

Referring to the drawings in detail, and particularly to Figs. 1–7, the parking device is shown to be attached to an automobile having right and left rear wheels 10 and 10a and a rear differential housing 11. The device has a support structure embodied in a housing 12 which is rigidly bolted to the front end of the differential housing by a plate 13 which is welded to the housing; bolts 14 may be over-length differential housing bolts. The housing is located to one side of the differential housing and forwardly of the right rear axle housing 16 to which it is further braced by a rearwardly extending, welded plate 15 having a rearwardly concave, arcuate notch for engaging the front half of the axle housing, thereby affording some vertical support. Any other suitable attachment may, of course, be used.

The front and rear walls 17 and 18 of the housing have downwardly open slots 19 and 20 and have circular recesses on their outer faces for receiving and positioning the stationary, outer rings of ball bearings 21 and 22 which are secured by bolted cap plates 23 and 24. The drive crank 25, herein referred to as the crank shaft, is rotatably mounted in these bearings and the external diameter thereof intermediate the bearings is enlarged to provide outwardly facing shoulders 25a and 25b which engage the inner, rotatable bearing rings to position the shaft axially. The cranks are in the form of eccentrics having inner bushings 26, 27 with eccentric bores for receiving the shaft 25; they are keyed to the shaft 180° out of phase by keys 28, 29 to cause sequential reciprocating movements. The term "sequential" is used to denote that the cycle of operation of one arm lags that of another arm. The ground-engaging walking arms 30, 31, have bores at their enlarged upper ends 30a, 31a, and are pivotally mounted on the bushings 26, 27, respectively, by ball bearings 32. The front arm 30 will hereinafter, for convenience, be referred to as the first arm. The bushings and the upper ends of the arms are preferably longitudinally elongated as shown to permit longitudinal spacing of the bearings 32 of each pair, thereby bracing the arms against longitudinal force applied to their lower ends; a pair of longitudinally spaced eccentrics operating in phase may, of course, be used for each arm instead of one elongated eccentric. The common geometrical axis of the bushing 26 and the bore in the end 30a, indicated at D in Figs. 7 and 9, forms the crank pin axis about which the arm 30 is pivotally mounted, this axis being shown in Figs. 6, 7 and 9 to be eccentric to the axis O of the shaft 25 towards the bottom and 30° toward the left of the vertical line passing through the shaft axis, this angle being designated H in Fig. 7. While this position is 30° before absolute bottom dead center, it corrresponds approximately to bottom dead center as the term is used herein. Similarly, the crank pin axis of the second arm 31 is shown to be eccentric by an equal magnitude and approximately at top dead center. The stroke of any specified arm while its crank pin axis is moving from top dead center to bottom dead center is herein referred to as the projection or power stroke; the stroke occurring while the axis is moving from bottom to top dead center is the retraction stroke.

The pull-down spring 33 is attached to the arm 30 at attachment point 34 and is anchored to the shaft 25 by means of a hook 35 having a stem 35a. The hook is retained on the outer ring of a ball bearing 36 which has a pair of radially outward flanges to form a sheave-like retaining structure. The tension line of the spring passes through the geometric center E of the race of bearing 36, which is herein referred to as the anchor point for the pull-down spring. As was previously indicated, this anchor point may be stationary (either concentric with shaft 25 or offset slightly along the line toward point 34) or movable; a movable anchor point will be first described, and a stationary arrangement will be described with reference to Fig. 13. Regardless of which structural arrangement is used, the anchor point should be so located that the spring 33 urges the arm 30 to rotate downward about its crank pin axis during a part of the cycle of rotation of the crank which includes the beginning of the power stroke, and to urge the arm to rotate upwardly during another part of the cycle. The use of a movable anchor point is preferred because it insures a more dependable engagement of the shoe at the end of the arm with the ground.

Figures 7, 13:
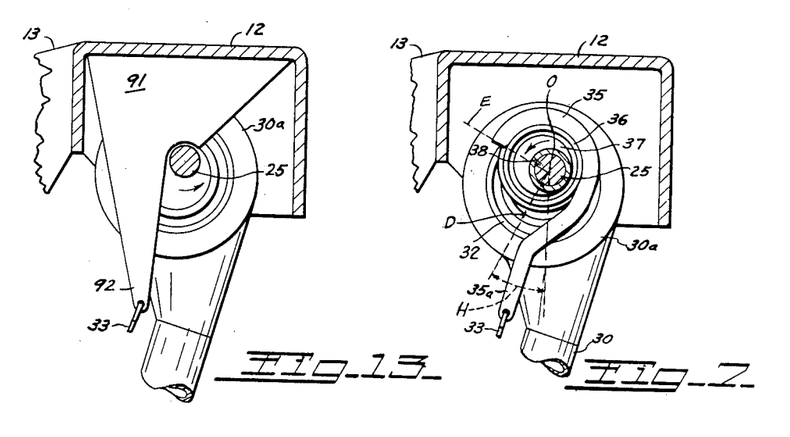
Fig. 7 is a transverse section view taken on line 7—7 of Fig. 6, looking from rear to front.
Fig. 13 is a transverse sectional view, corresponding to Fig. 7, showing a modified mounting for the anchor of the pull-down spring.
Figures 9, 10, 11:
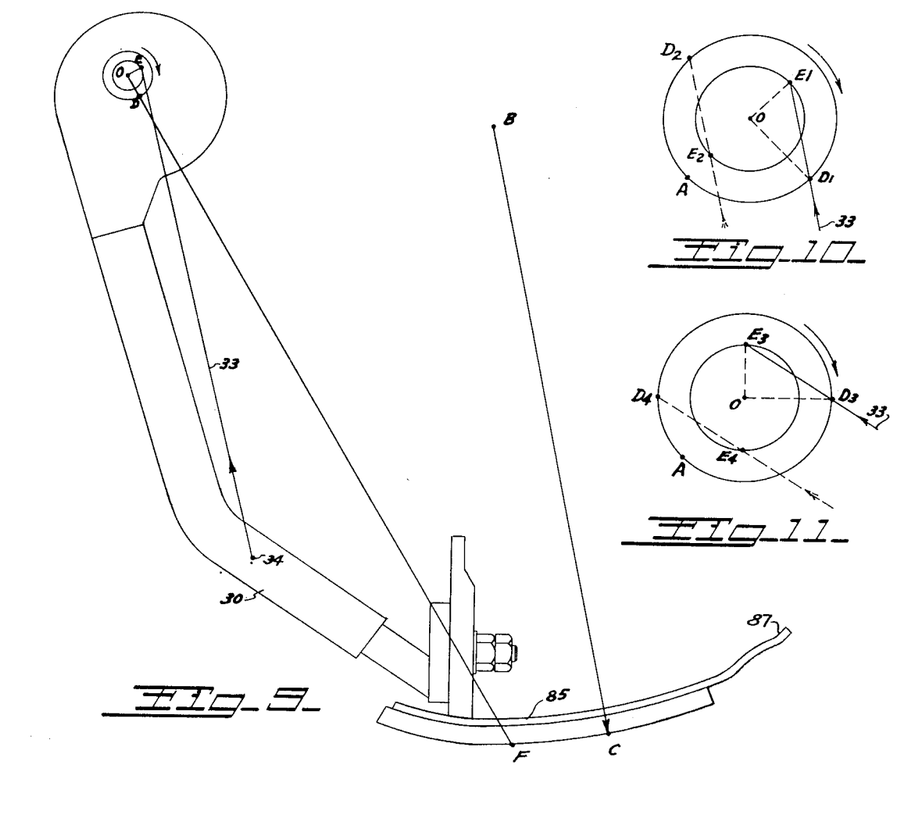
Fig. 9 is a diagrammatic view of one arm, looking from front to rear, illustrating the action of the pull-down spring.
Figs. 10 and 11 are diagrams corresponding to a part of Fig. 9 showing the action of the pull-down spring when the first arm is in operative position and in inoperative position, respectively.

The anchor point is indicated at E in Figs. 7 and 9 and is made movable by forming the inner race 37 of the bearing 36 with an eccentric bore for receiving the shaft 25 and securing the race 37 to said shaft 25 by a key 38, as shown in Fig. 7. The magnitude of the eccentricity of the anchor point is shown to be about half of that of the crank pin axis of the arm 30, but this relation is not critical and other relations may be used; thus the magnitudes of these eccentricities may be made equal or the anchor point may be given a greater throw. Further, the anchor point E must be out of phase with the crank pin axis of the arm 30, e. g., lagging 90° as shown in Fig. 7 by the angle EOD. While the invention is not limited to the use of any particular phase relationship, a lagging angle of between about 75° and 150° is preferred for reasons to be explained hereinafter. Other phase relationships, e. g., lagging from 150° to about 285° are also operative but are not preferred.

It is evident that the parts thus far described can be assembled by first securing the two bushings 26 and 27, together with their bearings 32 and arms 30 and 31, and the bushing 37, together with other parts of bearing 36 and the hook 35, to the shaft 25 and sliding the assembly upwards, the ends of the shaft extending through the slots 19 and 20. The bearings 21 and 22 and the caps 23 and 24 are then attached. The shaft 25 is then coupled by a sleeve 39 and bolts 40 to the output shaft 41 of an electric motor 42 having suitable reduction gearing (not shown) and mounted on the vehicle in any manner, e. g., to the torque tube or chassis.

Figure 8:
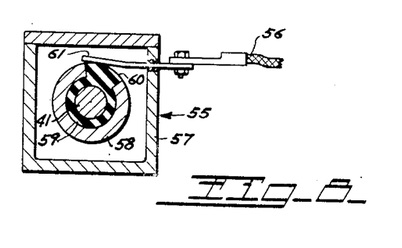
Fig. 8 is a sectional detail view of the limit switch.

The motor 42 is energized from the vehicle battery 43 through a circuit which includes a lead 44 connected to one motor terminal, a solenoid-operated switch 45 having spring loaded, normally open contacts, and a lead 46 connected to one side of the battery. The other terminal of the motor and the other side of the battery are shown to be grounded at 47 and 48, respectively. When the winding 49 of the switch is energized it acts to close the switch 45. This winding is controllably energized from the battery through two parallel circuits of which the first contains a manually operable control and the second contains an overriding control: the first of these includes a ground connection 50, a lead 51 to a press button switch 52 which may be mounted on the dash board of the vehicle, and a lead 53 to the battery; the second circuit includes the same ground connection 50 and lead 51, a lead 54 to a limit switch 55, and a lead 56 from the latter to the lead 46 and, through the latter, to the battery. The switch 55 has its casing 57 non-rotatably mounted, e. g., on the frame of the motor, and, as shown in Fig. 8, has a conducting commutator ring 58 mounted on the shaft 41 by an insulating ring or bushing 59. Ring 58 is interrupted by an insulated sector 60. A pair of brushes 61 (only one of which appears in Fig. 8), connected to the leads 54 and 56, makes contact with the ring 58; these brushes are electrically connected thereby except when the insulated sector 60 is opposite the brushes. The sector 60 is sufficiently wide to insure stopping the motor 42 despite decelerating rotation of the motor armature by inertia after power thereto is shut off. The shafts 25 and 41 are coupled in the proper angular relation to insure stopping the shaft 25 in a predetermined angular position with the crank pin axis of the first arm at a position A as shown in Figs. 10 and 11.

It is evident that when the manually operable switch 52 is depressed the winding 49 is energized, thereby closing switch 45 and causing operation of the motor 42. When switch 52 is opened the winding 49 remains energized through the limit switch 55 until the insulated sector 60 is opposite the brushes; winding 49 is thereupon de-energized, permitting the switch 45 to open and stopping the motor 42 with the shaft 25 in the predetermined angular position. The limit switch 55 thus constitutes an overriding control means that renders the manually operable switch 55 ineffective to interrupt the application of power to the motor unless the shaft 25 is in a predetermined angular position and to render the switch 55 effective to interrupt the power when the shaft 25 reaches said angular position.

A hold-up lever 61 is pivotally mounted on the rear side 18 of the housing 12 by a rotatable shaft 62 formed integrally with the lever. It is urged to rotate in a counter-clockwise direction (as viewed from the front, Fig. 3) by the main pull-up spring 63 which has one end thereof connected to a stud 64 at the left end of the lever, as viewed in Fig. 3. The other end of the spring is attached near the bottom, right side of the housing, as viewed in Fig. 3, to a stationary bracket 65 by means of an adjustable nut 66 and threaded eye-bolt 67, whereby the tension on the spring can be adjusted. The free end of the lever 61 has an integral extension 68 running forwardly and terminating in a fulcrum situated longitudinally in the interval between the arms (Fig. 4) and transversely above and slightly to the left of the upper parts of the arms (toward the right as viewed in Fig. 3). A link 69 is pivotally suspended from the fulcrum for movement to the right or left and provides a second fulcrum on which an equalizer bar 70 is balanced. The latter carries equalizer pull-up springs 71 and 72 at the ends thereof which are connected to the first and second walking arms, respectively, at points 73 and 74. It is evident that the springs 71 and 72 may, if desired, be replaced by non-elastic links or the like. The main hold-up spring 63, in urging the lever 61 to rotate in the stated direction, tends to raise the link 69, equalizer bar 70, and springs 71 and 72 to apply an upward torque to the arms. The pull of spring 63 should be weak enough to be overbalanced by the pull-down spring 33.

Figure 3:
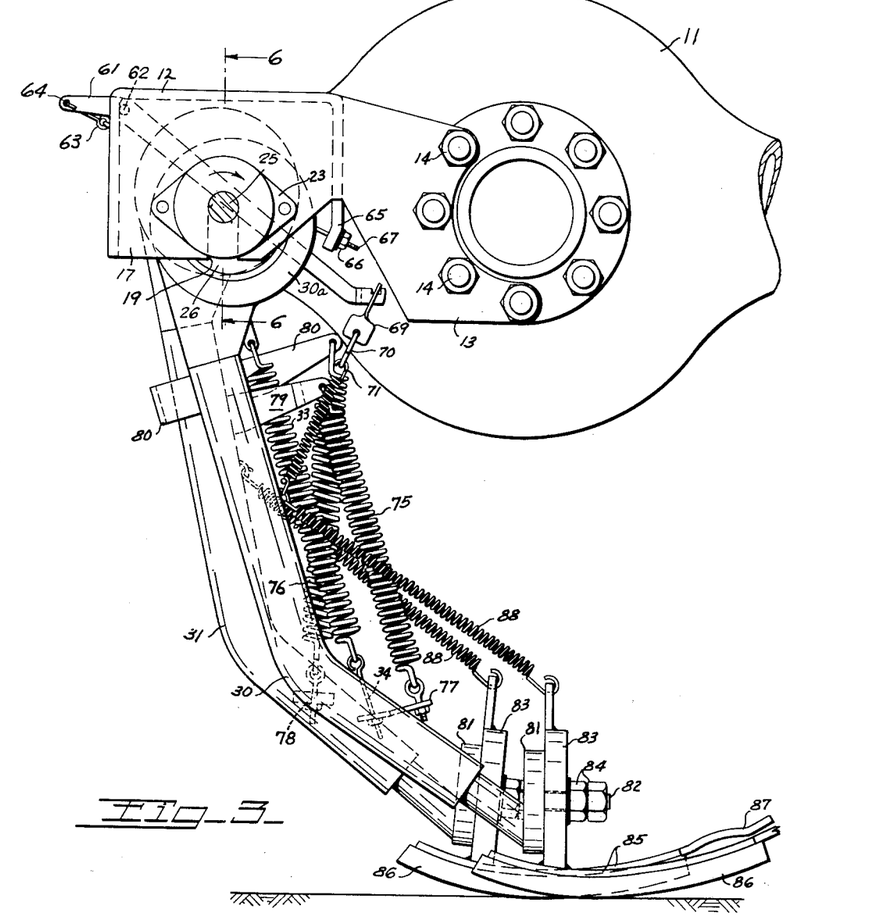
Fig. 3 is an enlarged front elevation view with the arms in operative position.

First and second coordinating springs 75 and 76 are provided to cause the arms and shoes to progress "forwardly" in the desired direction of vehicle displacement during slack periods. These springs have their first, lower ends connected at attachment points 77 and 78 to the first and second walking arms, respectively, these attachment points being remote from the crank pin axes. The second end of the first spring 75 is connected to the second arm 31 through a bracket 79 which is rigidly fixed to the latter arm. The spring engages the bracket near the crank pin axis of the arm and somewhat to the left of the arm (to the right, as seen in Fig. 3) so that the tension line of the spring 75 passes to the left of the crank pin axis (to the right, as seen in Fig. 3, to pull the arm 31 to rotate against the ground). The second end of the second spring 76 is similarly connected to the first arm 30 through a bracket 80 which is rigidly fixed to the arm 30; this bracket is, for convenience and to avoid overcrowding the springs, attached to the right side of arm 30 and passed around the right side and to the rear of arm 31 before extending to the left to the point at which the spring is attached. It is evident that each coordinating spring will, when extended, apply a downward torque to the arm which is connected to the upper, second end thereof and will, during at least a part of the cycle of operation, apply an upward torque to the other arm. It may be noted that, if the lengths of the brackets 79 and 80 toward the left of the arms (toward the right as seen in Fig. 3) is made small enough, the springs will during some parts of the cycle apply a downward torque also to the arms connected to their respective lower, first ends, and the invention may be applied with such shorter brackets, if desired.

Figure 4:
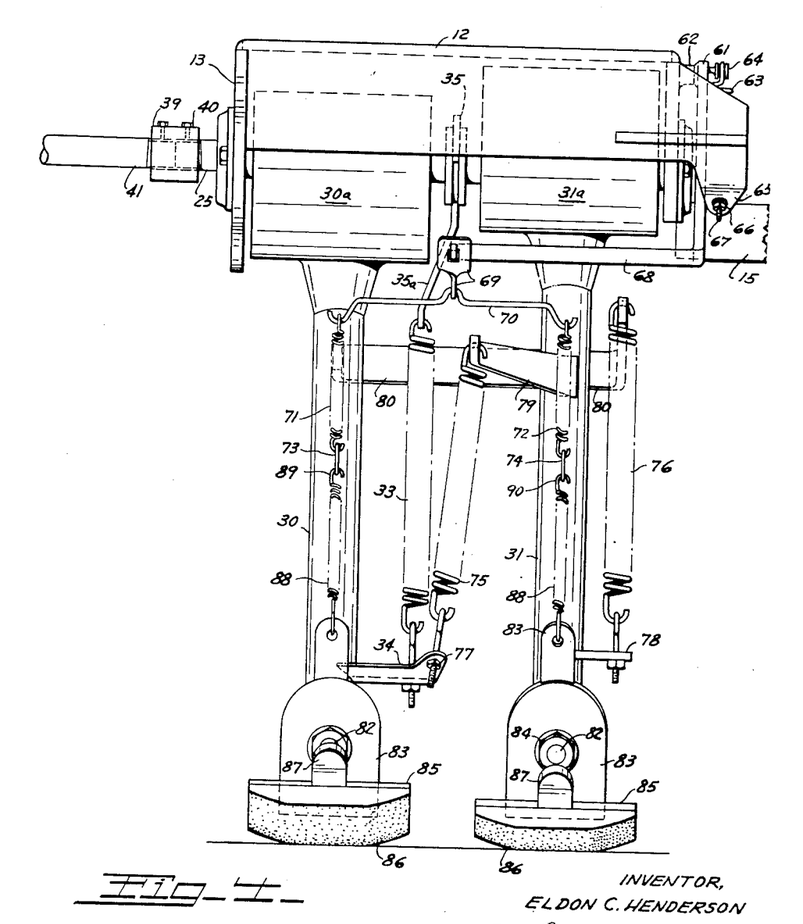
Fig. 4 is a side elevation showing the left side.
Figure 5:
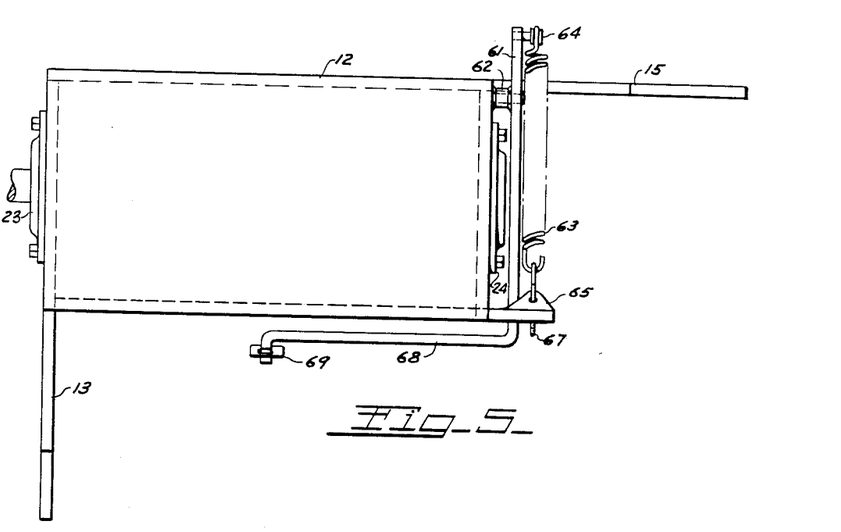
Fig. 5 is a fragmentary plan view, the arms and certain other parts being omitted.
Figure 6:
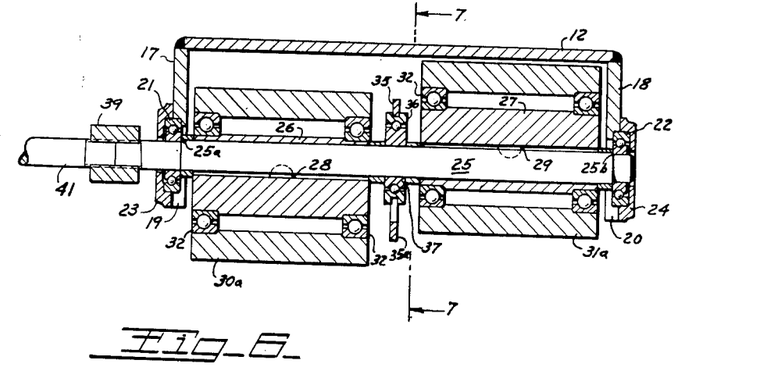
Fig. 6 is a vertical longitudinal section view taken on line 6—6 of Fig. 3.

Each walking arm has a block 81 rigidly attached to its lower extremity to have its outer face substantially vertical when the arm is in lowered, operative position. Each block carries a spindle 82, mounted perpendicular to the face, about which a shoe support lug 83 is rotatably mounted and secured by nuts 84. Each lug is rigidly fixed to a shoe 85 which has a facing 86 made of rubber or similar material having a high coefficient of friction with respect to the road surface. The tread of the facing 86 is downwardly convex along any suitable curve, and may, for example, be arcuate with a long radius of curvature BC about a point B, shown in Fig. 9 well to the left of shaft 25. The edges of the facing 86 may be rounded as shown in Fig. 4. The shoe has a toe 87 extending beyond the facing 86. A shoe-positioning spring 88 is attached to the top of each lug 83 above the spindle 82 and is anchored to the respective walking arm at 89 and 90. The springs 88 normally maintain the shoes in their neutral positions shown in the drawings but permit pivotal movements of the shoes in either direction about the spindles 82.

The action of the coordinating springs is as follows: These springs perform two functions, viz., that of causing the two arms to rotate in close sequence between their operative and inoperative positions, and that of advancing each arm, during a slack period, ahead of the other in coordinated movements or "steps." The first function is easily understood because the springs prevent too great a difference between the angular positions of the two arms; hence, when the first arm is rotated downwardly by the action of the pull-down spring the second arm is made to follow the first arm down through the action of the spring 75, in opposition to the hold-up spring. When the first arm is swung to inoperative position the second arm moves also, being raised mainly by the hold-up spring 63 and assisted by the spring 76.

Considering the second function of these springs, it is evident that each spring 75 and 76, when tensioned, applies a torque on both arms; these torques would be equal and opposite if the arms were pivoted about a common axis. However, the torques are equal to the products of the spring forces and the effective lever arms, the latter being the perpendicular distances from the spring tension lines to the crank pin axes of the arms. Both the spring forces and the effective lever arms change during the cycle of operation, so that the torques applied by the two ends of each spring are unequal except momentarily at two points in each cycle. The more important of these variables is the spring force. Because the coordinating springs have their opposite ends attached at points which are displaced longitudinally with respect to the arms they are alternately projected and retracted in a manner causing the pull on the spring having its second end attached to the arm which is nearer to top dead center than the other arm to exceed the pull on the other spring. Hence the arm which is nearer to top dead center is given a torque which rotates the arm during its slack part of the cycle downwardly to a more nearly vertical position than the distended arm; in other words, the shoe of the slack arm is advanced ahead of the loaded shoe.

Various spring adjustments may be used. Thus, the lengths of the springs may be made such that each spring is just slack when the arm connected to its upper, second end passes bottom dead center; more specifically, the spring 76 may have such length as to be momentarily untensioned in the position of shaft 25 and of the arms shown in Figs. 3, 6 and 7, when the point 78 and the bracket 80 are closest together, and spring 75 may have a length to be momentarily slack 180° later in the cycle. However, the invention is not limited to such spring lengths, and the springs may be somewhat shorter (thereby maintaining some tension on them throughout the cycle and improving the pull-down action from inoperative position). Even somewhat longer springs are operative and may be used. The springs, in any of these lengths, jointly exert a strong downward torque on each arm near top dead center. The exact part of the cycle in which such torque acts depends upon the geometrical arrangement and relative dimensions of the arms and brackets 79 and 80 and the spring lengths. Typically, the downward torque commences about 25° to 90° before, reaches a maximum near to, and continues until 60° to 140° beyond top dead center of the crank pin axis. An upward torque is applied during part or all of the part of the cycle during which no downward torque is applied.

Figure 12:
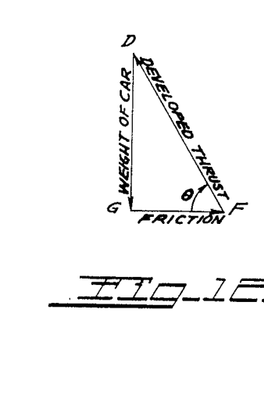
Fig. 12 is a vector diagram illustrating the action of the device in displacing the vehicle.

It should be noted that the reversal of the torque of the coordinating springs from downward to upward occurs during the power stroke of the arm, while it is loaded and in frictional engagement with the ground; this loading prevents upward rotation of the arm, provided the angle $\theta$ in Fig. 12 is great enough. During this stroke the previously loaded arm is being retracted and is given a downward torque. The action is thus repeated, each arm being alternately the projected arm and the retracted arm. The coordinating springs may, therefore, be aptly described as resilient means for applying a downward torque on each arm when at top dead center, tensioned by the projected arm, this being the second function. They may further be described as resilient means for moving one arm from inoperative to operative position upon movement of the other arm between these positions, this being the first function.

The action of the pull-down spring will now be described with reference to Figs. 9–11, wherein O represents the axis of the shaft 25; D the crank pin axis of the walking arm 30; and E the anchor point of the spring 33. E is seen to lag D by 90°. In Fig. 9 the line from the attachment point 34 on arm 30 to point E, which is the line of action of the spring 33, is seen to lie to the right of point D. The spring, therefore, tends to rotate the arm 30 upwards (counter-clockwise) about the crank pin axis D. In other words, the spring applies an upward torque in the illustrated position and acts as a pull-up spring, in concert with main pull-up spring 63. But when the shaft 25 is rotated to position point D to fall on the right of line E–34 the spring 33 applies a downward torque.

Fig. 10 illustrates two positions $D_1$ and $D_2$ for the crank pin axis, and corresponding positions $E_1$ and $E_2$, respectively for the anchor point. $D_1$ and $D_2$ are both inflection points at which the pull-down spring 33 exerts neither a positive nor a negative torque, the figure being constructed for the case in which the arm is in its operative position. While the crank pin axis moves clockwise from $D_1$ to $D_2$ the spring applies an upward torque; from $D_2$ to $D_1$ it applies a downward torque. It will be noted that the point A, at which the crank pin axis is stopped by the limit switch 55, is just in advance of the point where the spring exerts its greatest upward torque.

Figure 1:
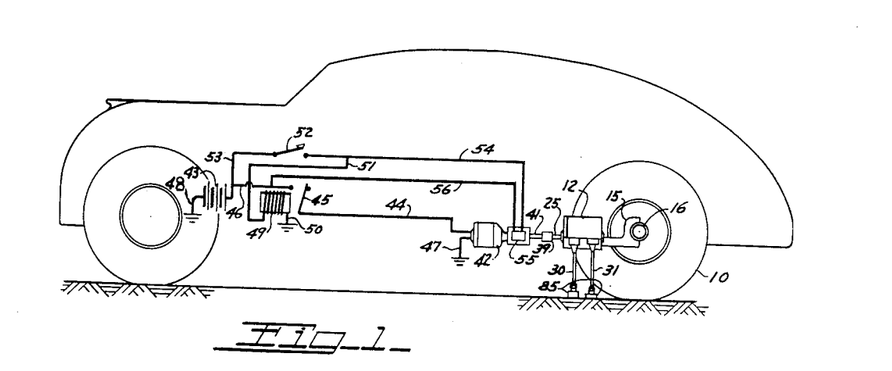
Fig. 1 is a side elevation view of the device installed in a vehicle with the walking arms in operative position, parts being shown in phantom and the electrical circuit being shown diagrammatically.
Figure 2:
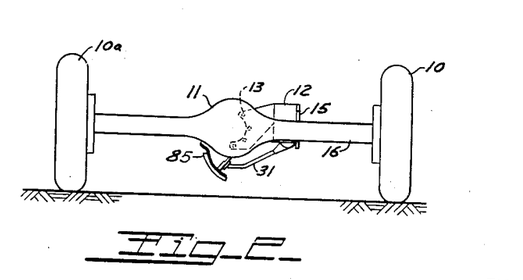
Fig. 2 is a rear elevation of the installed device with the arms in raised, inoperative position.

When the arms are raised to their inoperative positions as shown in Fig. 2 the lines of action of the spring 33 assume the positions shown in Fig. 11, being inclined farther from the vertical. Here $D_3$ and $D_4$ indicate inflection point positions of the crank pin axis and $E_3$ and $E_4$ are corresponding positions of the anchor point. During movement of the crank pin axis clockwise from $D_3$ to $D_4$ the spring 33 exerts an upward torque and from $D_4$ clockwise to $D_3$ the spring exerts a downward torque. Point A is seen to be just beyond but close to the point where the spring exerts its greatest upward torque, so that the arm is held securely in elevated position when out of service.

From the foregoing it is evident that when the arms are initially in raised positions, rotation of shaft 25 in the direction indicated by the arrow causes the pull-down spring to exert a downward torque on arm 30 from the time the crank pin axis passes point $D_4$. Some distance beyond that point the downward torque is sufficient to overbalance the main hold-up spring 63 and the arm 30 thereupon is rotated into operative position, reaching that position sometime after the crank pin axis has passed point $D_2$ of Fig. 10. This places tension on coordinating spring 75 causing the arm 31 to be also rotated downwardly.

It is desirable that the pull-down spring 33 exert its maximum downward torque near the beginning or just prior to the beginning of the power stroke of arm 30 and that such torque be continued into the early part of the power stroke. The early application of the downward torque is important to insure that the shoe of the first arm is well engaged with the ground and becomes loaded before the pull-down springs cease to exert a downward torque. In this connection it may be noted that some time will be lost by the downward rotation of the arm 30 and that if the downward rotation does not start well before the crank pin axis D reaches top dead center it may happen that the power stroke is well under way before the arm is in operative position; in this case the shoe of arm 30 may not make effective frictional engagement with the ground and the arms will again move to inoperative position after the crank pin axis passes point $D_1$. When the bushing 37 is phased within the preferred range to cause point E to lag D by about 75° to 150°, particularly when the lag is close to 90°, the above-stated desired condition is best realized. While somewhat stronger torques are attained with a given spring stiffness by increasing the lag angle above 150° this is not usually the determining consideration inasmuch as the torque can also be increased by increasing the eccentricity of the anchor point.

*Operation*

To operate the device when the arms are in their raised position, shown in Fig. 2, the switch 52 is depressed and held closed for the time that it is desired to operate the device. This energizes winding 49, thereby closing switch 45, starting motor 42, and rotating shafts 41 and 25 in the direction indicated, i. e., clockwise in Fig. 3. The three eccentrics on the latter shaft then rotate and when the crank pin axis of the first arm 30, represented by point D in Figs. 9–11, passes position $D_4$, the pull-down spring 33, which is anchored on the center eccentric at a point represented at E, exerts a downward torque on arm 30. Somewhat beyond point $D_4$ this torque becomes sufficient to overbalance the hold-up spring 63 and the first arm is rotated downwardly about its axis D until the shoe 85 thereof engages the ground at point F; this occurs before the point D has reached top dead center. (Top dead center is herein given a restrictive meaning; see ante.) Coordinating spring 75 causes the second arm 31 to follow the first into operative position.

After the axis D passes top dead center the arm 30 is projected downwardly to effect the power stroke and the arm 31 is simultaneously retracted. The shoe 85 of arm 30 makes frictional contact with the ground, thereby applying a compressive thrust from point F and raising the vehicle slightly to take part of the load of its rear wheels. The forces acting are shown vectorially in Fig. 12, wherein D represents the crank pin axis, F the contact point with the ground, and G a ground point vertically beneath D and at the level of F. Regarded as a vector diagram—which is valid because the arm has no motivated torque at D—DG represents the part of the weight of the vehicle which is carried by the arm; FD represents the compressive thrust of the arm; and GF represents the horizontal frictional resistance of the tires against the road. When the horizontal component of FD exceeds GF the rear vehicle wheels are moved to the right by a sliding movement to achieve the object of the invention. It is evident that in the course of the vehicle movement the arm 30 tilts slightly toward horizontal position, thereby decreasing its loading; this decrease is offset by the continuing power stroke of the crank. Because of the absence of motivated torque on the arm, the latter is able to adapt itself nicely to peculiar roadbed conditions; while the various springs impose torques on the arm they are minor in magnitude in comparison to the forces involved in shifting the vehicle laterally. It is further seen that the arcuate lower face of shoe 85 rolls along the roadbed as the arm tilts, resulting in a progressively decreasing distance FD; this results in a smaller tilt in the arm for a given displacement of the vehicle than would occur if the arm made contact with the ground at a single point and reduces the chance for the shoe to skid out from under the device. A further advantage of this arrangement is that a flat part of the shoe is always in engagement with the roadbed. It is evident that the coefficient of friction between the shoe and the roadbed must be great enough to prevent slippage at the angle $\theta$ shown in Fig. 12.

Simultaneously with the above action the second arm 31 is retracted and the coordinating springs 75 and 76 apply a downward torque thereto as its crank pin axis approaches top dead center. The shoe 85 of the second arm will thereby be made to progress to the right while the arm 30 is shifting the vehicle and engage the ground somewhat to the right of (i. e., ahead of) the contact point F of the first arm; in other words the angle $\theta$ of Fig. 12 will be smaller for arm 31 at the beginning of the power stroke thereof than for the arm 30 at the end of the power stroke thereof. When the second arm passes its top dead center and makes its power stroke its shoe is pressed firmly against the ground and becomes loaded, while the first arm is retracted. The operation previously described for the first arm is now repeated by the second arm, and the arms thus take alternate walking steps or "bites" by virtue of their sequential operation to move the vehicle progressively to the right.

When the switch 52 is released the motor continues to operate until the insulated sector 60 of the switch 55 is opposite the brushes; this opens the circuit to winding 49, thereby opening the switch 45 and stopping the motor with the crank pin axis D of the first arm at the predetermined angular position indicated at point A in Figs. 10 and 11. The car is left in this position, with part of the weight on the rear wheels and part of the weight on the walking arms; normally arm 31 will be loaded when the car is thus parked but both arms may be loaded, e. g., when slippage occurs.

Since only a part of the normal rear wheel load is carried by the walking arms these wheels engage the ground with sufficient force to provide traction. Hence, to move the car either forwardly or rearwardly from parked condition it is simply driven under its own power. The shoe 85 of the arm or arms engaged with the ground then pivots about its respective spindle 82, releasing the shoe from frictional engagement with the ground and permitting the main hold-up spring 63 and the pull-down spring (now acting to exert an upward torque) to raise the arms into their inoperative, raised position shown in Fig. 2. It is seen that this stowing action takes place automatically, without attention on the part of the vehicle operaor. The springs 88 return the shoes to their normal positions on the arms, ready for future operation.

The long toe 87 on each shoe is able to dig into soft or unsurfaced roadways but does not otherwise normally play a part in the operation of the device on surfaced roads. Another function of the toe is to prevent the complete rotation of the arms toward the right side of the vehicle in the event that the device is operated over a rut or reasonably deep hole.

The pivotal mounting of the shoes on the arms is optional because the shoes would not remain frictionally secured to the ground once the car is placed in motion. However, to avoid drag on the arms during the first part of such motion the provision of pivotal supports is highly desirable.

Referring now to Fig. 13, showing a modified construction with a stationary anchor point, there is shown the housing 12 and shaft 25 which are constructed as previously described, except that the housing has a transverse web 91 permanently fixed, e. g., welded, thereto and that the shaft does not carry a central eccentric bearing for the pull-down spring. The web 91 has a downwardly extending tab 92 located to one side of the shaft 25 to permit the latter to be assembled to the housing as previously described. The upper end of the pull-down spring 33 is connected to an eye in the tab 92 which forms the stationary anchor point and is located to position the spring tension line as previously described. The functioning of this modified device is similar to that previously presented in connection with Figs. 9–11, with the difference that all of the points D and the point A in Figs. 10 and 11 are rotated in a clockwise direction from the positions shown and that the point E is stationary. In other words, the downward torque is effective during a somewhat later portion of the cycle and also changes into an upward torque at a later point in the cycle. This simplified construction is not as versatile as the one previously described since the action of the spring 33 is dependent in part upon the angle $\theta$, Fig. 12, a factor which is eliminated by providing a moving anchor point.

I claim as my invention:

1. A parking device for displacing a vehicle in a desired direction comprising, in combination: a support structure adapted to be mounted on the vehicle above the ground; a plurality of ground-engaging walking arms having lengths to extend from the ground obliquely upwards in the said direction to the support structure having connections with the said structure for free rotation and for retraction from and projection toward the ground; actuating means on said support structure acting on said arms for sequentially retracting and projecting the arms without applying a motivated torque thereto, whereby the distances from the lower ends of the arms to the support structure are alternately increased and decreased; and resilient means acting on said arms and reacting on a part of the device for applying a yieldable downward torque on said arms at least during parts of their respective cycles of operation in which they are respectively retracted, whereby each lower end is urged pivotally against the ground when retracted and the said lower ends are advanced alternately along the ground in the said direction when said actuating means is operated.

2. The parking device according to claim 1 wherein the resilient means for applying a downward torque comprises a coordinating spring connected to one arm to apply a downward torque thereto and further connected to the other of said arms to act between said arms.

3. The parking device according to claim 1 wherein the resilient means for applying a downward torque comprises a coordinating tension spring attached to said two walking arms at attachment points located at different distances from their points of connection to said structure, whereby the distance between the two attachment points varies as the arms are sequentially retracted and projected, the tension line of the spring being to one side of the point of connection of one arm at least when the said one arm is retracted so as to impose a downward torque thereon.

4. A parking device for displaying a vehicle in a desired direction comprising, in combination: a support structure adapted to be mounted on the vehicle above the ground; a plurality of ground-engaging walking arms having lengths to extend from the ground obliquely upwards in the said direction to the support structure; crank means on the support structure adapted for continuous rotation in one direction about a substantially horizontal axis and having a plurality of crank pin axes disposed out of phase with one another, each of said arms being pivotally connected at a different one of said crank pin axes to the crank means and freely rotatable thereon, whereby said arms are sequentially projected and retracted when the crank means is continuously rotated; and resilient means acting on said arms and reacting on a part of the device for applying a yieldable downward torque on said arms at least during parts of their respective cycles of operation in which they are respectively retracted, whereby each lower end is urged pivotally against the ground when retracted and the said lower ends are advanced alternately along the ground in the said direction when said crank means is rotated.

5. The parking device according to claim 4 wherein the resilient means comprises a pull-down spring connected to one of said arms and further connected to said structure to a point that is located to one side of the crank pin axis of said arm at least when said arm is retracted so as to apply said downward torque thereto.

6. The parking device according to claim 5 wherein the resilient means comprises, in addition to said pull-down spring, a coordinating spring connected to said one arm at an attachment point spaced a relatively greater distance from the crank pin axis thereof and to the other arm at a relatively smaller distance from the crank pin axis thereof, whereby the distance between the two attachment points varies as the arms are sequentially retracted and projected, said attachment point on the said other arm being located in relation to the crank pin axis thereof to be on one side of said axis at least when said other arm is retracted, so as to impose a downward torque thereon when said one arm is lowered and the said other arm is retracted.

7. A parking device for displacing a vehicle in a desired direction comprising, in combination: a support structure adapted to be mounted on the vehicle above the ground; a plurality of ground-engaging walking arms of lengths to extend from the ground obliquely upwards in the said direction to the support structure; crank means on the support structure having a plurality of crank pin axes extending substantially horizontally and perpendicular to the said direction arranged at different orientations, each walking arm being pivotally connected to rotate about one of said axes; and a coordinating tension spring for each arm, each spring having one part thereof connected to the respective arm remote from the crank pin axis for said arm and the other part of the spring being connected to another arm nearer the crank pin axis of said other arm than the distance from the connection of said first part of the spring to the said crank pin axis of the respective arm, the tension line of the spring between said spring connections extending near to and to the side of the crank pin axis of said other arm away from the said direction of desired vehicle displacement at least when the said other arm is retracted.

8. A parking device for displacing a vehicle in a desired direction comprising, in combination: a support structure adapted to be mounted on the vehicle above the ground; a plurality of ground-engaging walking arms having free pivotal supports connected to said structure for pivotal movements of the arms free of motivated torque and adapted to engage the ground at points spaced from their respective pivotal supports in a direction opposite to said direction; drive means on said structure for alternately projecting and retracting each of said arms with respect to the support structure, the movements of each arm being out of phase with those of another arm; resilient means acting on said one arm and reacting on said support structure and having a cyclic operation synchronized with the movements of said one arm for alternately applying to said one arm an upward resilient torque urging it to rotate about its pivotal support away from the ground and a downward resilient torque urging it to rotate against the ground; and resilient coordinating means interconnecting said one arm with another arm which is operated out of phase therewith for applying a downward torque to said other arm for rotating the latter arm against the ground at least when the latter arm is retracted.

9. In combination with the device according to claim 8, a hold-up spring connected to said other arm and to said support structure applying an upward torque thereto resiliently urging it away from the ground, said upward torque of the hold-up spring being smaller than the downward torque of the resilient coordinating means.

10. In combination with the device according to claim 8, power means drivingly connected to said drive means for applying power thereto; manually operable control means connected to said power means for controlling the application of power by said power means to said drive means to place the latter into operation; and overriding control means connected to said power means and responsive to the position of the drive means in the cycle of operation thereof for rendering said manually operable control means ineffective to interrupt the application of power unless said first-mentioned arm is in a position in its cycle of operation in which said first-mentioned resilient means applied an upward torque, said overriding control means being adapted to render the manually operable control means effective to interrupt the application of power when the said first-mentioned arm reaches the said position in its cycle of operation.

11. In combination with the device according to claim 8, an electric motor drivingly connected to said drive means; an electrical circuit connecting said motor to a source of electric current; switch means connected in said circuit for manually opening or closing said circuit; and a position-responsive limit switch connected to said circuit to close said circuit irrespective of the position of said switch means except when the position-responsive switch is in a predetermined position, said position-responsive switch being connected to said drive means to occupy said predetermined position when said first-mentioned resilient means applied an upward torque to said first-mentioned arm.

12. A parking device for displacing a vehicle in a desired direction comprising, in combination: a support structure adapted to be mounted on the vehicle above the ground; a pair of ground-engaging walking arms having free pivotal supports connected to said structure for pivotal movements of the arms free of motivated torque and adapted to engage the ground at points spaced from their respective pivotal supports in a direction opposite to said direction; drive means on said structure for alternately projecting and retracting each of said arms with respect to the support structure, the movements of one arm being substantially 180° out of phase with those of the other arm; resilient means acting on said one arm and reacting on said support structure and having a cyclic operation synchronized with the movements of the arms for alternately applying an upward resilient torque to said one arm urging it to rotate about its pivotal support away from the ground and a downward resilient torque to the same arm urging it to rotate against the ground; and resilient coordinating means interconnecting said arms for applying a downward torque to the other arm when retracted.

13. A parking device for displacing a vehicle in a desired direction comprising, in combination: a support structure adapted to be mounted on the vehicle above the ground; crank means on the support structure mounted for continuous rotation in one direction and providing a plurality of cranks at different angular positions; a plurality of ground-engaging, walking arms of lengths to extend to the ground obliquely upwards in the said direction to the cranks, the upper ends of said arms having free rotatable connections to said cranks, whereby said upper ends move sequentially with circular movements and the distances from the lower ends of the arms to the support structure are sequentially varied; and resilient means for applying a downward torque rotating said arms against the ground, said means including a pull-down spring attached to one of said arms and to said support structure at an anchor point thereon, said anchor point being situated in relation to the crank means so that the line of action of the pull-down spring is to one side of the pivot axis of said one arm during a part of the cycle of said circular movement and to the other side of said axis during another part of said cycle, whereby the pull-down spring tends to rotate said one arm about said pivot axis downwardly against the ground during one part of said cycle and upwardly away from the ground during another part of the cycle.

14. The parking device according to claim 13 wherein the said pull-down spring is a tension spring attached to said one arm at a point removed from said pivot axis and anchored at an anchor point in the vicinity of said pivot axis.

15. The parking device according to claim 14 wherein the said anchor point is rotatable about the axis of said crank means out of phase with the movement of the upper end of said one arm.

16. The parking device according to claim 15 wherein the anchor point lags the upper end of said one arm by an angle between about 75° and 150°.

17. The parking device according to claim 13 wherein the said pull-down spring is a tension spring attached to said arm at a point remote from said pivot axis and anchored to an anchor point on the support structure that is stationary with respect thereto and in the vicinity of the said pivot axis.

18. In combination with the parking device according to claim 13, a hold-up spring connected to at least an arm other than said one arm, said hold-up spring being connected to said support structure to apply an upward torque which is smaller than the downward torque of the said resilient means.

19. A parking device for displacing a vehicle in a transverse direction comprising, in combination: a support structure adapted to be mounted on the vehicle above the ground; a plurality of walking arms having shoes at the lower extremities thereof, said shoes having ground-engaging faces which are downwardly convex and elongated transversely to the vehicle, the arms being of lengths to extend obliquely from the shoes when the latter are engaged to the ground in the said transverse direction to the support structure, said arms being rotatably mounted on said structure about longitudinal axes of the vehicle; means on said support structure and operatively connected to said arms for imparting sequential reciprocating movements to said arms free of motivated torque for alternately increasing and decreasing the distance from the shoes to the support structure; and resilient means acting on said arms and reacting on said support structure for applying a downward torque on said arms at least during the parts of their respective cycles of operation in which said arms are retracted for urging their shoes against the ground and advancing the said shoes alternately in the said transverse direction.

20. The parking device according to claim 19 wherein the said shoes have pivotal supports on the arms for rotation about axes which extend substantially horizontally and transversely with respect to the vehicle when the shoes are in engagement with the ground, whereby said shoes can rotate about said axes to release the shoes from frictional engagement with the ground when the vehicle is moved forwardly or rearwardly.

21. The parking device according to claim 19 wherein the said shoes have toes extending beyond the convex, ground-engaging faces in a direction away from the said transverse direction for preventing said arms from rotating the shoes beyond the nadir and toward the said transverse direction.

22. A parking device for displacing a vehicle in a desired direction comprising, in combination: a support structure adapted to be mounted on the vehicle above the ground; a plurality of walking arms having lengths to extend from the ground obliquely upwards in the said direction to the support structure and having at their upper ends connections to the said structure for free rotation and for retraction from and projection toward the ground; actuating means on said support structure acting on said arms for sequentially retracting and projecting the arms; a ground-engaging shoe at the lower end of each arm elongated along said desired direction and having a downwardly convex surface; and a connection between each shoe and the respective arm constraining the arm to extend obliquely upwards from said shoe in a direction to the side of the center of curvature of the shoe toward the said desired direction, whereby said shoe will engage the ground at varying distances from said connected upper end of the arm in accordance with the angle of inclination thereof.

23. A walking arm for a parking device of the character described comprising: a ground-engaging shoe having an elongated lower face, said face being curved downwardly convex with respect to the direction of elongation thereof to engage the ground at different parts of said face in accordance with the inclination of the shoe; and a stem having a pivotal connection with the said shoe about an axis which is substantially horizontal when the shoe is in engagement with horizontal ground at an intermediate part of said face, said axis extending substantially in the said direction of elongation and said pivotal connection constraining the stem to extend obliquely upwards from said shoe in a direction toward one side of the center of curvature of said intermediate part of the face when the shoe is in the stated position on the ground, whereby the distance from the point of contact of said shoe with the ground to the upper end of the stem is variable in accordance with the inclination of said stem.

24. In combination with the walking arm according to claim 23, resilient means acting on the shoe and reacting on the stem for urging the shoe to a neutral position with the convex face thereof toward the ground when the stem is in a vertical plane that extends in the said direction of elongation.

25. A walking arm for a parking device of the character described comprising: a ground-engaging shoe having an elongated lower face, said face being curved downwardly convex with respect to the direction of elongation thereof to engage the ground at different parts of said face in accordance with the inclination of the shoe; a stem having a connection with the shoe constraining the stem to extend from said shoe in a direction having a fixed angular relation thereto measured in the vertical plane that extends obliquely upwards from said shoe in a direction toward one side of the center of curvature of an intermediate part of said lower face when the shoe is in engagement with horizontal ground at the said intermediate part of said face, whereby the distance from the point of contact of said shoe with the ground to the upper end of the stem is variable in accordance with the inclination of said stem; and a toe connected to said shoe and extending beyond said convex face thereof in a direction away from said stem.

26. A parking device for displacing a vehicle transversely comprising, in combination: a support structure adapted to be mounted horizontally on the vehicle above the ground; a crank shaft on said support structure; power means for rotating said shaft continuously in one direction; three eccentric cranks on said shaft, two of which are out of phase with each other by about 180°, and the third of which lags the first by between about 75° and 150°; a pair of walking arms freely rotatable about the crank pin axes of the first and second eccentric cranks, respectively, for reciprocating movement, said arms having lengths to extend obliquely downwardly to the ground in directions opposite to the desired direction of the vehicle displacement; a ground-engaging shoe at the lower end of each arm having a pivotal connection to the respective arm about an axis which is substantially horizontal and transverse with respect to the vehicle when the shoe is in engagement with the ground, each shoe having a downwardly convex face elongated in the said desired direction; resilient means connected between each shoe and the respective arm for urging the respective shoe to a neutral position on its respective arm with the face of the shoe directed toward the ground when the arm is in a lowered position; a pull-down spring on the arm that is rotatable on the axis of the first eccentric crank, said spring having one part thereof connected to said arm at a point remote from said first crank pin axis and having another part thereof anchored to the third eccentric crank to impart a downward torque to said arm during a part of the cycle of rotation of the crank shaft and an upward torque during another part of the cycle; a pair of coordinating springs, each said coordinating spring having one part thereof connected to a corresponding arm near the crank pin axis thereof and having another part thereof connected to the other arm remote from the crank pin axis thereof, the tension line of each spring between said spring connections thereof being near to and to one side of the crank pin axis of the corresponding arm at least when said corresponding arm is at top dead center for imparting a downward torque to said arm urging the shoe thereof against the ground; and resilient hold-up means connected to at least one of said arms and to said support structure for rotating said arms upwardly from the ground with a torque which is less than the downward torque applied by the said pull-down spring.

ELDON C. HENDERSON.

References Cited in the file of this patent

UNITED STATES PATENTS

| Number | Name | Date |
|---|---|---|
| 880,526 | Hele-Shaw | Mar. 3, 1908 |
| 912,108 | Gaskill | Feb. 9, 1909 |
| 1,256,651 | Bohmker | Feb. 19, 1918 |
| 1,888,049 | Peebles et al. | Nov. 15, 1932 |
| 2,003,361 | Harless | June 4, 1935 |
| 2,047,818 | Barr et al. | July 14, 1936 |

FOREIGN PATENTS

| Number | Country | Date |
|---|---|---|
| 20,118 | Great Britain | Sept. 25, 1908 |
| 446,221 | France | Nov. 29, 1912 |